May 24, 1927.
L. J. BUTTOLPH
1,630,233
LIGHT FOR MICROSCOPES AND THE LIKE
Filed Oct. 3, 1923
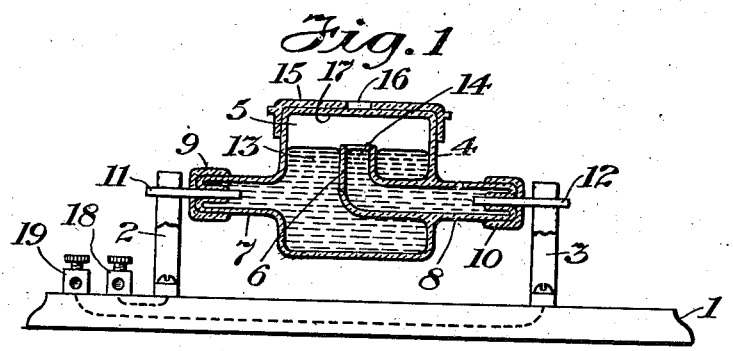
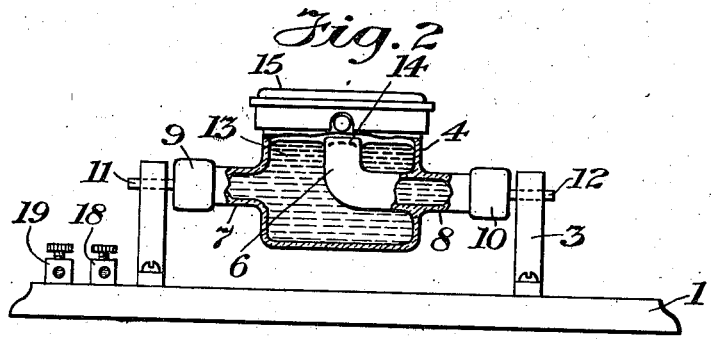
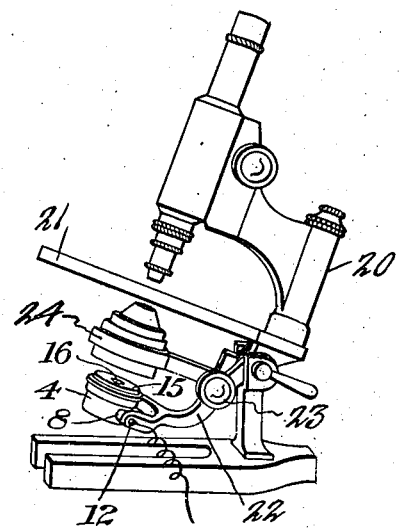
INVENTOR
Leroy J. Buttolph
BY
Thos. H. Brown
HIS ATTORNEY Patented May 24, 1927.

1,630,233

UNITED STATES PATENT OFFICE.

LEROY J. BUTTOLPH, OF EAST ORANGE, NEW JERSEY, ASSIGNOR TO COOPER HEWITT ELECTRIC COMPANY, A CORPORATION OF NEW JERSEY.

LIGHT FOR MICROSCOPES AND THE LIKE.

Application filed October 3, 1923. Serial No. 666,284.

This invention relates to an illuminator for microscope sub-stages and which is capable of general use with optical apparatus. It particularly relates to an illuminator having a concentrated light spot.

The purpose of this invention is to provide a source of light for microscopes and other devices in the use of which is desired a light of high intensity but which is concentrated in a small area. The necessity for this arises from the fact that heretofore the mercury arc sources of light for this have been of such shapes and sizes that the distribution of light over the illuminated area has not been uniform. The result of this was that when objects were observed or photographed through a microscope that the uneven illumination produced shadow effects that prevented an accurate study of the object.

Again when the vision was confined to such small areas as were under uniform illumination this area was necessarily so small as to prove a material hindrance to the progress of the work being done. Accordingly another purpose of this invention is to provide a light source which will uniformly illuminate the usual microscope objective area.

The high intensity of light is obtained by the use of an electric arc in a vacuum between two pools of mercury. The uniformity of illumination is obtained by masking all but the cathode spot of the arc, and by forming the top of the lamp sufficiently close to the arc to prevent any clouding or obscuring through the condensing of mercury thereon.

In the drawing Fig. 1 is a longitudinal section of the lamp in elevation. Figure 2 is an elevation view of the lamp. Figure 3 shows the lamp mounted under a microscope.

In the drawings this lamp is shown mounted on a base and supported by standards on which the lamp is designed to be swung for the purpose of starting the lamp and of directing the light.

In Fig. 1 of the drawings the lamp is shown to consist of an L-shaped tube 8 the upright 6 of which is coaxial with the body 5 of the lamp. The long leg 8 of the elbow is sealed through the walls of 4, and through the closed end thereof is sealed the terminal 12 over which is fitted the cap 10. The short leg 6 of the L opens into the body 5 of the lamp. Another tube 7 has its end sealed into the side of 4 opposite to tube 8. The inner end of 7 communicates with the interior of 4 and the other end is closed and has sealed into it a terminal 11 similar to 12. The lamp is made with the top 17 quite close to the opening of 6 into 5 and a cap 15 is fitted over the top of 4 to mask all the light from the lamp except that which comes from the center of the lamp and which is allowed to pass through the opening 16 in the center of the cap 15. Mercury, 13 and 14, is placed in the body of the lamp and the L, respectively, to the edge of 6 so that a little tilting of the lamp will cause the two bodies of mercury to join. The lamp is suspended by the terminals 11 and 12 in the spring clips 2 and 3 which are connected to the binding posts 18 and 19, respectively. The clips 2 and 3 are mounted on a suitable base 1.

In Fig. 2, is shown a conventional type of microscope 20 beneath the stage 21 of which is mounted the lamp 4, embodying my invention, for pivotal movement on its terminals 11 and 12 by means of which said lamp 4 is rotatably mounted in the fork 22 which fork is pivotally mounted by means of the screw 23 for adjusting the distance between the lamp 4 and stage 21, a focusing lens 24 positioned between the lamp 4 and stage 21 being likewise pivotally mounted and adjustable by means of said screw 23. Lamp 4 is then tiltable in said fork 22 for properly directing the light to the focusing lens 24 between its limits of tilting movement and is also movable by adjusting said fork 22 pivotally through said screw 23.

In the operation of my device direct current supply leads are connected to the binding posts 18 and 19. The negative lead being connected to 19 so that the mercury 14 in the tube 6 serves as the cathode of the lamp. Then to start the lamp it is tipped to unite the two bodies 13 and 14 of mercury and then tipped back again to break the connection between 13 and 14. When this break is made an arc is drawn between the two bodies of mercury, putting the lamp into operation. The arc between 13 and 14 may move around the perimeter of the end of 6 but only the light from the cathode spot is used for illumination, the rest being shielded by the cap 15. And as the cathode spot emits a uniform amount of light this arc serves as an efficient light for the purpose intended.

I claim as my invention:

1. A vapor arc lamp comprising a closed envelope, a tube sealed through the wall of said envelope and opening within the body of the envelope, and lead-ins sealed into said envelope and said tube, said lead-ins being aligned and diametrically opposed with respect to the vertical axis of said lamp.

2. A vapor arc lamp comprising a closed envelope, mercury in said envelope, a tube sealed through the wall of said envelope and opening just above the surface of said mercury, mercury within said tube at substantially the same level as that of the other said body of mercury, and lead-ins sealed into the walls of said envelope and said tube, said lead-ins being aligned and diametrically opposed with respect to the vertical axis of said lamp.

3. A vapor arc lamp comprising a closed envelope, mercury in said envelope at a level near the top surface of said envelope, a tube sealed through the wall of said envelope and opening just above said mercury level, mercury in said tube at substantially the same level as that of the other said body of mercury, and lead-ins sealed into the walls of said envelope and tube respectively and being aligned for a part of their respective lengths outside the lamp.

4. A vapor arc lamp comprising a closed envelope, mercury in said envelope at a level near the top surface of said envelope, a tube sealed through the wall of said envelope and opening just above the level of said mercury, mercury in said tube at substantially the level of the other said body of mercury, and lead-ins sealed into the walls of said envelope and tube respectively, said lead-ins being aligned and diametrically opposed with respect to the vertical axis of said lamp.

5. A vapor arc lamp comprising a substantially cylindrical envelope having a substantially flat top, mercury in said envelope at a level near said top, a tube sealed through the side wall of said envelope and opening just above said mercury level, mercury in said tube at substantially the level of the other said body of mercury, a lead-in sealed into said tube and positioned perpendicularly to the axis of said envelope, and a lead-in sealed into the wall of said envelope and positioned diametrically with respect to the other said lead-in, whereby said lead-ins serve as trunnions for the mounting and positioning of said lamps.

6. In combination with an electric vapor-arc lamp comprising a substantially cylindrical envelope having a substantially flat top, mercury in said envelope at a level near said top, a tube sealed through the side wall of said envelope and opening just above said mercury level, mercury in said tube at substantially the level of the other said body of mercury, a lead-in for the mercury in said tube sealed through the wall of said tube and positioned perpendicularly to the axis of said envelope, and a lead-in for the first said body of mercury sealed through the wall of said envelope and positioned diametrically with respect to the envelope and other said lead-in, a source of direct current supply the positive side of which is connected to the lead-in of first said body of mercury and the negative side of which is connected to the lead-in of mercury in said tube, trunnion mountings for said lead-ins, and a mask having a central opening over the top of said lamp.

Signed at Hoboken in the county of Hudson and State of New Jersey this 1st day of October, A. D. 1923.

LEROY J. BUTTOLPH.